United States Patent
Jyumonji et al.

(10) Patent No.: US 7,157,677 B2
(45) Date of Patent: Jan. 2, 2007

(54) METHOD OF PICKING UP SECTIONAL IMAGE OF LASER LIGHT

(75) Inventors: Masayuki Jyumonji, Yokohama (JP); Masakiyo Matsumura, Kamakura (JP); Yukio Taniguchi, Yokohama (JP); Masato Hiramatsu, Tokyo (JP); Hiroyuki Ogawa, Nara (JP); Noritaka Akita, Hiratsuka (JP)

(73) Assignee: Advanced LCD Technologies Development Center Co., Ltd., Yokohama (JP)

( * ) Notice: Subject to any disclaimer, the term of this patent is extended or adjusted under 35 U.S.C. 154(b) by 0 days.

(21) Appl. No.: 11/178,562

(22) Filed: Jul. 12, 2005

(65) Prior Publication Data

US 2006/0043258 A1  Mar. 2, 2006

(30) Foreign Application Priority Data

Aug. 26, 2004  (JP) .............................. 2004-246896

(51) Int. Cl.
*G02B 7/04* (2006.01)
*G02B 27/40* (2006.01)
*G02B 27/64* (2006.01)

(52) U.S. Cl. ............................... 250/201.4; 250/201.2; 250/201.3

(58) Field of Classification Search .. 250/201.2–201.4; 369/44.24, 275.1
See application file for complete search history.

(56) References Cited

U.S. PATENT DOCUMENTS

| 4,687,916 A | * | 8/1987 | Emoto et al. ............. 250/201.5 |
| 5,828,500 A | * | 10/1998 | Kida et al. .................. 359/798 |
| 6,005,838 A | * | 12/1999 | Fan et al. ................. 369/275.1 |
| 6,717,124 B1 | * | 4/2004 | Atkinson et al. ......... 250/201.2 |

* cited by examiner

*Primary Examiner*—Stephone B. Allen
*Assistant Examiner*—Suezu Ellis
(74) *Attorney, Agent, or Firm*—Oblon, Spivak, McClelland, Maier & Neustadt, P.C.

(57) ABSTRACT

A knife edge is disposed at a height corresponding to a section on which a sectional image (light intensity distribution) is picked up in such a manner as to intercept a part of the section of the laser light. The knife edge is irradiated with the laser light, and the sectional image of the laser light is enlarged with an image forming optics, and is picked up by a CCD. While picking up the sectional image in this manner, focusing of the image forming optics is performed. Next, the knife edge is retracted from the optical path of the laser light, the laser light is allowed to enter the CCD via the image forming optics, and the sectional image of the laser light is picked up.

8 Claims, 7 Drawing Sheets

METHOD OF PICKING UP SECTIONAL IMAGE OF LASER LIGHT

CROSS-REFERENCE TO RELATED APPLICATIONS

This application is based upon and claims the benefit of priority from prior Japanese Patent Application No. 2004-246896, filed Aug. 26, 2004, the entire contents of which are incorporated herein by reference.

BACKGROUND OF THE INVENTION

1. Field of the Invention

The present invention relates to a method of picking up a sectional image (i.e., light intensity distribution in a certain cross section). The method of the present invention is suitable especially for measurement of a two-dimensional intensity distribution of laser light for use in laser-annealing a semiconductor thin film.

2. Description of the Related Art

In flat panel type display devices such as an active matrix type liquid crystal device and an organic EL display device, a large number of thin film transistors (hereinafter abbreviated as TFT) are formed on an insulating substrate of glass, plastic or the like in order to individually drive each pixel. As to an amorphous silicon (a-Si) film, since a forming temperature is low, the film can be comparatively easily formed by a vapor phase process, and mass productivity is also superior, the film has been broadly used as a semiconductor thin film for forming a source, drain, or channel region of the TFT.

However, the amorphous silicon film has a disadvantage that the film is inferior to a polycrystalline silicon (poly-Si) film in physical properties such as conductivity (mobility of a-Si is lower than that of poly-Si by two or more digits). Therefore, there is a demand that a technique for forming the source, drain, or channel region of the TFT in the polycrystalline silicon film be established in order to increase an operation speed of the TFT.

For example, an annealing method using excimer laser (excimer laser annealing: hereinafter referred to as an ELA process) is used as a method of forming the polycrystalline silicon film. This annealing method can be performed in a temperature range (i.e., from room temperature to about 500° C.) in which a general-purpose glass substrate is usable.

In the ELA process, for example, after depositing an amorphous silicon film in a predetermined thickness (e.g., about 50 nm) on a substrate, the amorphous silicon film is irradiated with krypton fluoride (KrF) excimer laser light (wavelength of 248 nm), xenon chloride (XeCl) excimer laser light (wavelength of 308 nm) or the like. The amorphous silicon film is locally molten, recrystallized, and changed to the polycrystalline silicon film.

It is to be noted that the ELA process is applicable to various other processes, when an average intensity (fluence) of the laser light is changed. For example, when the intensity of the laser light is set to a range having an only heating function, the process is usable in an impurity activation step for the TFT. When the intensity of the laser light is excessively increased, a rapid temperature rise is caused, and therefore the process is usable for removing the film from the TFT. It is to be noted that the use of the phenomena is not limited to the TFT, and the phenomena are broadly applicable to a semiconductor manufacturing process.

Additionally, in a case where the TFT is formed of a polycrystalline silicon film in order to increase the operation speed in the flat panel type display device like the liquid crystal display device, the organic EL display device or the like, a large fluctuation is generated in a threshold voltage (Vth) of the TFT, when there is a fluctuation in the number or distribution of a crystal grain boundary included in the channel region of each TFT. This is a cause for lowering operation characteristics of the whole display device. Therefore, there has been a demand for a TFT in which the number of crystal grain boundaries is homogenized as much as possible in each channel region, or crystal grains are grown to be larger than the channel region, and positions of the crystal grains are controlled to thereby remove the crystal grain boundary from each channel region.

The present inventors have developed the laser annealing process for forming a silicon film having a large crystal grain diameter. In the process, an optical device (phase-modulation device) referred to as a "phase shifter" is inserted midway in an optical path irradiated with the laser light, and accordingly a two-dimensional intensity distribution of laser light is adjusted on the amorphous silicon film to grow crystal grains having large grain diameters. Here, the phase shifter is an optical device in which a fine plane pattern is formed of stepped portions comprising grooves or protrusion in a transparent quartz substrate. The phase shifter imparts a phase difference to a part of the laser light passing through the shifter, and produces the two-dimensional intensity distribution of the laser light by diffraction of the laser light and interference of laser light having different phases. When the two-dimensional intensity distribution of the laser light is adjusted in this manner, an appropriate temperature distribution is produced on the substrate to be treated. Accordingly, it is possible to control a position of a single silicon crystal having a large grain diameter of about 2 to 7 microns in forming the crystal.

The following has been found as a result of development of the laser annealing process. That is, as to the laser light with which the amorphous silicon film is irradiated, a pattern of the intensity distribution in a micro region having a submicron level is remarkably important for the controlling of the positions of the crystal grains in order to form the grains having large grain diameters. However, a method of exactly measuring the intensity distribution is very difficult partly because the excimer laser light is invisible light of an ultraviolet region, and the method has not been established yet.

The following methods have heretofore been known as methods for measuring the intensity distribution of the laser light for use in the ELA process.

In one of the methods, the amorphous silicon film is irradiated with laser light, and the intensity distribution of the laser light is evaluated based on changes of physical properties of the film. That is, the amorphous silicon film, which is a process target, is irradiated with the laser light with a light intensity (fluence) having such a threshold value that crystallization is induced. Then, an only portion having a high light intensity forms polycrystalline silicon, and the physical properties partially change. Therefore, after irradiating the amorphous silicon film with the laser light, a tissue of the corresponding portion is observed with a microscope, so that the intensity distribution of the laser light can be estimated. It is to be noted that in the evaluation method based on the changes of the physical properties, it is possible to utilize not only the crystallization of the amorphous silicon film but also the changes of physical or chemical properties of another material (e.g., photoresist).

In another method, a substrate exclusive for use in image pickup is used whose surface is coated with a fluorescent agent (Jpn. Pat. Appln. No. 2004-020104). In this method, the surface of a coating film of the fluorescent agent is aligned with a transverse surface where the intensity distribution of the laser light is to be measured. The above-described substrate for image pickup is held, and the surface of the substrate for image pickup is irradiated with the laser light. In this case, fluorescence emitted from the fluorescent agent is two-dimensionally enlarged using an image forming optics, and a sectional image (light intensity distribution) of the laser light is picked up on the back surface of the substrate for image pickup.

Here, the former method of measuring the laser light intensity distribution based on the changes of the physical properties has had the following problem. That is, since the changes of the physical properties depend on a threshold value of the light intensity, the laser light intensity has to be changed in a stepwise manner, and a plurality of times of laser irradiation and physical property evaluation are required. As a result, fluctuations of conditions for the laser irradiation are included in the evaluation results. Since there are also fluctuations in a material itself that causes the physical property changes, it is very difficult to grasp the light intensity distribution as a "plane image", and the evaluation cannot be said to be correct. Furthermore, since the physical properties are evaluated by offline inspection, much time is required until the results are obtained.

On the other hand, the latter method of picking up the sectional image of the laser light by conversion into the fluorescence has had the following problem. That is, since the fluorescence is visible light, a spatial resolution of the resultant sectional image is not approximately 0.5 μm or less corresponding to a wavelength of the fluorescence. In general, fluorescent materials are toxic, and largely influence environments.

BRIEF SUMMARY OF THE INVENTION

The present invention has been developed in view of the above-described conventional problems concerning a method of measuring an intensity distribution of laser light. An object of the present invention is to provide an image pickup method capable of pickup a sectional image (light intensity distribution) in a certain cross section of the laser light exactly in a short time with a high spatial resolution.

The present invention provides a method of pickup a sectional image of laser light in a cross section, comprising the steps:

disposing an image pickup device in front of the cross section with respect to a direction in which the laser light travels;

disposing an intercepting unit in the cross section in such a manner as to intercept a part of the laser light;

picking up, by use of the image pickup device, a light and shade image indicating an intensity distribution of the laser light whose part is intercepted by the intercepting unit;

adjusting a focus of an optical system of the image pickup device in such a manner that a pattern of the resultant light and shade image satisfies predetermined conditions; and retracting the intercepting unit from an optical path of the laser light, and picking up the sectional image of the laser light in the cross section by use of the image pickup device.

According to the method of the present invention, the focus of the optical system of the image pickup device can be exactly matched with the cross section (e.g., position corresponding to the surface of a substrate to be treated) based on sharpness of a boundary between bright and dark portions of the light and shade image. Additionally, since the laser light is directly detected, it is possible to exactly pick up the sectional image (light intensity distribution) of the laser light in the cross section.

For example, the intercepting unit is a knife edge-like member and is disposed so that a tip of the knife edge is within the cross section, when a part of the laser light is intercepted using this unit.

Alternatively, the intercepting unit is a transparent substrate a part of whose surface is coated with an interceptive thin film. Furthermore, the intercepting unit is disposed so that the interceptive thin film is within the cross section, when a part of the laser light is intercepted using this substrate.

Moreover, in a laser annealing apparatus, an intensity distribution of laser light can be monitored using the above-described method. In this case, the laser annealing apparatus irradiates a semiconductor thin film formed on a substrate to be treated with laser light having a gradient of light intensity to crystallize the semiconductor thin film, the apparatus comprising:

a sample stage which holds the substrate;

a laser light source which emits the laser light toward the substrate;

an attenuator which is disposed between the laser light source and the sample stage and which reduces the intensity of the laser light;

an intercepting unit configured to intercept a part of the laser light in the same plane as the substrate while the sample stage is retracted from an optical path of the laser light;

a driving mechanism configured to alternately insert and retract the sample stage and the intercepting unit with respect to the optical path of the laser light;

an image pickup device disposed on a back surface of the intercepting unit in the optical path of the laser light; and a focusing mechanism which picks up, by use of the image pickup device, a light and shade image indicating an intensity distribution of the laser light whose part is intercepted by the intercepting unit and which adjusts a focus of an optical system of the image pickup device.

In this laser annealing apparatus, the optical system of the image pickup device is focused, and the sectional image of the laser light is picked up according to the above-described method. As a result, after it is confirmed that predetermined conditions are satisfied by the intensity distribution of the laser light in the position corresponding to the surface of the substrate to be treated, the sample stage is moved, and the substrate to be treated is set in the optical path of the laser light. In this state, the semiconductor thin film on the substrate to be treated is irradiated with the laser light.

Preferably in the above-described laser annealing apparatus, an optical homogenizing system and a phase shifter are disposed in order in the optical path of the laser light between the attenuator and the sample stage. The optical homogenizing system homogenizes a two-dimensional intensity distribution of the laser light. The phase shifter is disposed in a focal position of the optical homogenizing system, and produces the two-dimensional intensity distribution of the laser light.

When the method of the present invention is used in the laser annealing apparatus, it is possible to measure the intensity distribution of the laser light in the position corresponding to the surface of the substrate to be treated exactly for a comparatively short time. Therefore, the intensity distribution of the laser light can be maintained in a satisfactory state. When the intensity distribution of the laser light is exactly adjusted, a targeted silicon crystal having a large grain diameter can be grown from an amorphous silicon thin film or a polycrystalline silicon thin film on the substrate.

DETAILED DESCRIPTION OF THE INVENTION

Embodiment 1

A method of pickup a sectional image of laser light will be described according to the present invention.

Figure 1:
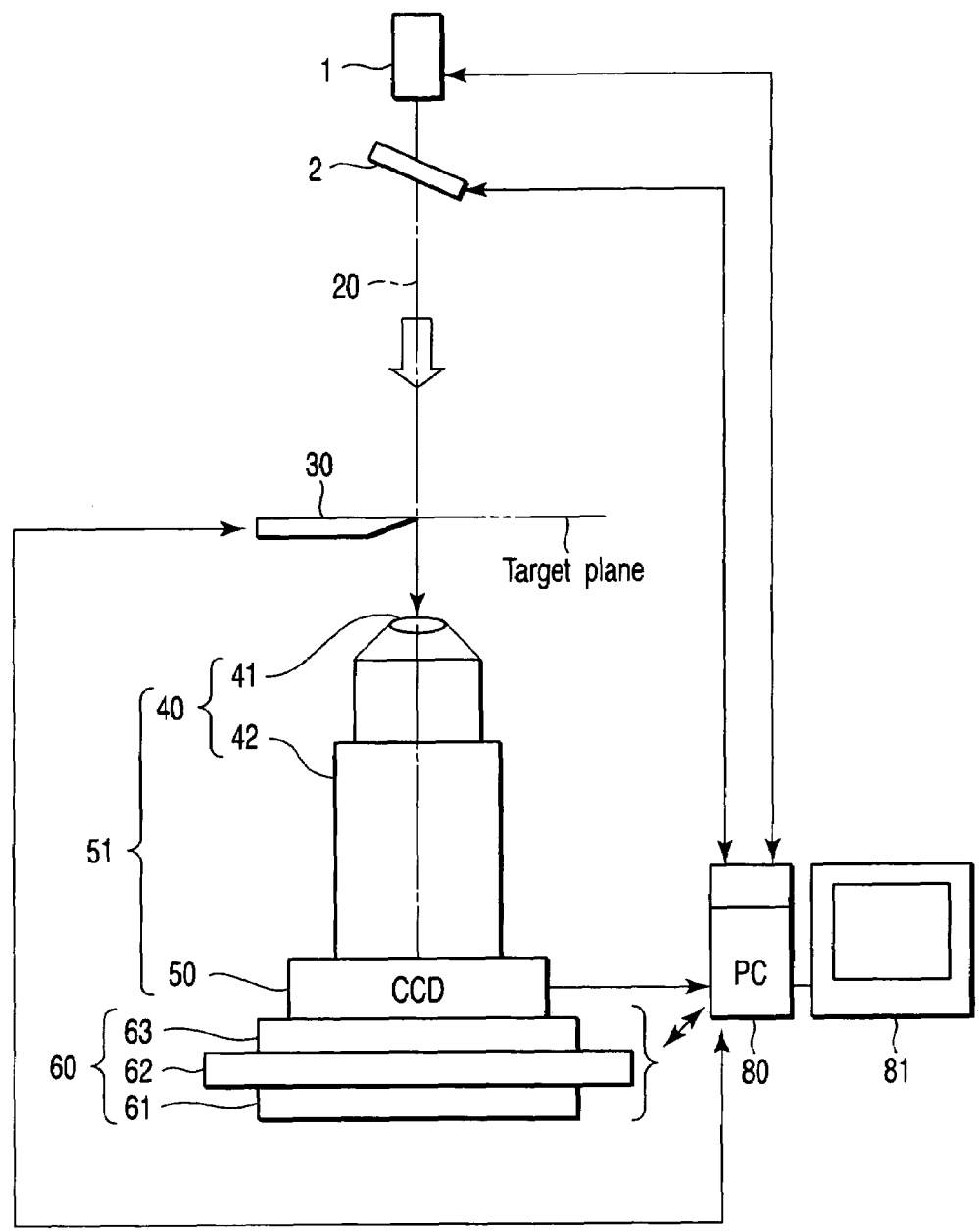
FIG. 1 is a schematic diagram showing an example of a constitution of an apparatus in a case where a sectional image of laser light is picked up using a method of the present invention.

FIG. 1 shows an example of a schematic constitution of a device for pickup the sectional image of the laser light. An attenuator 2, a knife edge 30 (intercepting unit), and an image pickup device 51 are disposed in order along an optical path of laser light 20 emitted from a laser light source 1. The attenuator 2 adjusts intensity of the laser light 20 into a predetermined intensity. The knife edge 30 is disposed in a cross section in such a manner as to intercept a part of the laser light 20 in order to specify the cross section on which a two-dimensional intensity distribution of the laser light 20 is to be measured. The image pickup device 51 is disposed in front of the knife edge 30 with respect to a travel direction of the laser light 20, and picks up an image of a tip portion of the knife edge 30. Furthermore, after the knife edge 30 is retracted from the optical path of the laser light 20, the sectional image of the laser light 20 is picked up in the above-described plane.

The image pickup device 51 comprises an image forming optics 40 and a CCD 50. The image forming optics 40 comprises an objective lens 41 and an optical cylinder 42. The CCD 50 is attached to a rear end (lower surface) of the optical cylinder 42. The objective lens 41 forms incident light into an image on a photoelectric conversion surface of the CCD 50. The CCD 50 converts the incident light into an electric signal by photoelectric effects. The optical cylinder 42 shields the optical path from the objective lens 41 to the CCD 50 from external light.

The image pickup device 51 is held on an image pickup stage 60. The image pickup stage 60 comprises: an X-stage 61 which moves in an X-axis direction; a Y-stage 62 which is supported on the X-stage 61 and which moves in a Y-axis direction; and a Z-stage 63 which is supported on the Y-stage 62 and which moves in a vertical direction (Z-direction). The image pickup device 51 is positioned with respect to an optical axis of the laser light 20 by the X-stage 61 and the Y-stage 62. Focusing of the objective lens 41 is performed by vertical movement of the Z-stage 63.

It is to be noted that when any sectional image is not picked up, that is, when a substrate to be treated is laser-annealed, the knife edge 30, the image pickup device 51, and the image pickup stage 60 can be retracted outside an extended line from the optical axis of the laser light 20.

An output circuit of the CCD 50 is connected to a computer 80, and this computer 80 is connected to a display 81 which selectively displays input or output information. The computer 80 automatically performs control of laser oscillation by the laser light source 1, control of a quantity of the laser light by the attenuator 2, control of the attenuator based on information of a light and shade image by shading of the knife edge 30, control of a position of the image pickup device 51 in an X-Y-Z axial direction and the like.

Next, a method of picking up a sectional image of laser light using this system will be described.

Prior to picking up the sectional image of the laser light, first the focusing of the image forming optics 40 is performed using the knife edge 30. That is, the knife edge 30 is positioned and held on the optical axis of the laser light 20 in such a manner that a part of the laser light 20 is intercepted by a section of the edge. A height of a tip of the knife edge 30 is adjusted in such a manner as to align the tip with a cross section on which the intensity distribution of the laser light 20 is to be measured (therefore, with the surface of the substrate to be treated using the laser light 20).

In this state, the laser light 20 is emitted from the laser light source 1 toward the knife edge 30, the light and shade image by the shading of the knife edge 30 is two-dimensionally enlarged by the objective lens 41, and the image is picked up by the CCD 50. Data obtained by the CCD 50 are analyzed in the computer 80. The computer 80 controls the image pickup stage 60, a stage 110 (FIG. 8) for intercepting unit, the attenuator 2, and the laser light source 1, and adjusts a visual field and a focus of the image pickup device 51 while repeating the image pickup. That is, the computer 80 moves the X-stage 61 and the Y-stage 62 to match the visual field of the image pickup device 51 with the tip of the knife edge 30, and moves the Z-stage 63 to match the focus of the image pickup device 51 with the tip of the knife edge 30.

Thereafter, the knife edge 30 is retracted, and the sectional image of the laser light 20 in the above-described cross section is picked up by the image pickup device 51. In this case, the computer 80 automatically performs control of a timing of the laser oscillation by the laser light source 1, adjustment of the quantity of the laser light and the like.

Details of the focusing of the image pickup device 51 will be described further. When the knife edge 30 is positioned as described above on the optical path of the laser light 20, an image (light and shade image) of a tip portion of the knife edge 30 is picked up by the CCD 50. While repeating the picking up of the image of the tip portion of the knife edge 30 in this manner, the focus of the image forming optics 40 is adjusted in such a manner that a gradient of the light intensity in a boundary portion of the shading by the knife edge 30 has a steep degree which is not less than a preset target value.

Figure 2:
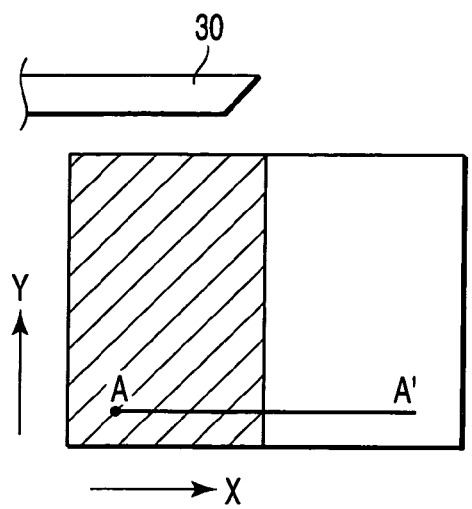
FIG. 2 is a diagram showing an example of a light and shade image (two-dimensional light intensity distribution) in focusing of an optical system of an image pickup device using a knife edge in the method of the present invention.
Figure 3A:
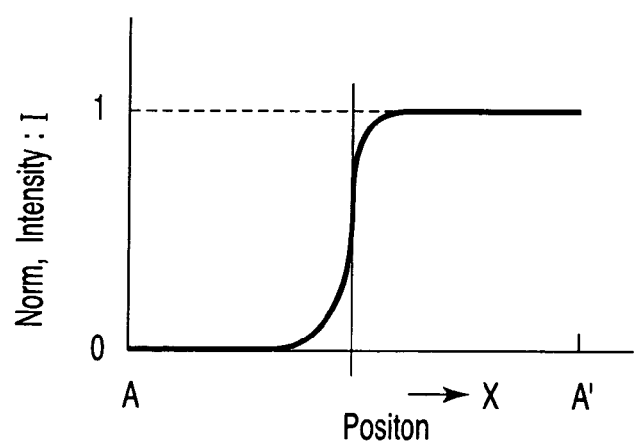
FIG. 3A is a diagram showing a light intensity distribution along a line A–A' in the example shown in FIG. 2.
Figure 3B:
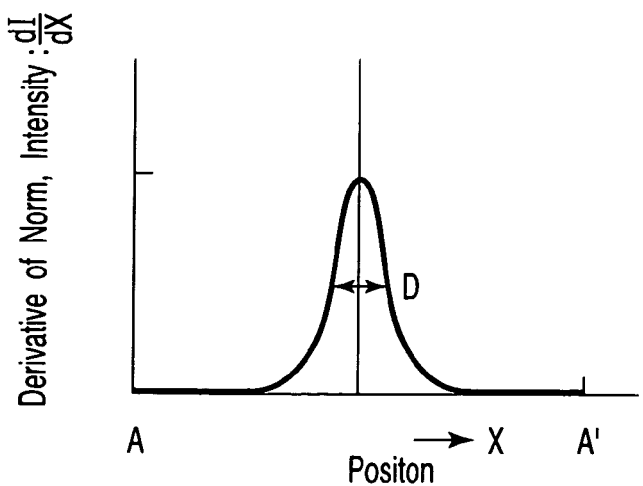
FIG. 3B is a diagram showing derivative values of the light intensity distribution along the line A–A' in the example shown in FIG. 2.

Specifically, as in a two-dimensional image shown in FIG. 2, a region shielded by the knife edge 30 is displayed darkly, and another region is displayed brightly. FIG. 3A shows a normalized one-dimensional light intensity distribution along A–A' of FIG. 2. A dark level (0) is indicated in a point A, but the level rapidly rises outside the region of the knife edge 30, and a point A' indicates a bright level (1). When a distance of a transition region from the dark level to the bright level is shortest, the focus of the image pickup device 51 agrees with the tip of the knife edge 30. It is to be noted that when the laser light 20 has a satisfactory coherency, fringes (high-frequency components) are sometimes generated in opposite ends of the transition region by effects of Fresnel diffraction. In this case, when an appropriate low pass filter is applied to a waveform, the fringes can be removed. To clarify a focal position, the waveform of FIG. 3A is differentiated with regard to a distance x. As a result, a distribution curve is obtained as shown in FIG. 3B. When a breadth D is shortest which indicates a half value of a maximum value of the distribution curve, the focus of the image pickup device 51 agrees with the tip of the knife edge 30.

When this system is used in a crystallization apparatus of a semiconductor thin film, the knife edge 30 is disposed in a position corresponding to (i.e., as high as) the surface of the substrate to be treated. When it is necessary to confirm the light intensity distribution of the laser light during operation of the crystallization apparatus, the substrate to be treated is retracted, and the knife edge 30 is disposed in the corresponding position. In this stage, the image pickup device 51 is positioned and focused. Next, after retracting the knife edge 30, the laser light is oscillated. Then, the sectional image in the focal position is formed on the photoelectric conversion surface of the CCD 50. It is possible to confirm a pattern of the light intensity distribution on the surface of the substrate to be treated in this manner.

The knife edge 30 is preferably used as the intercepting unit as described above. In this case, the tip of the knife edge 30 is worked with a flatness precision of ±0.1 µm or less, and accordingly a cross section (object surface on which a sectional image is to be picked up) can be exactly specified as an object of the focusing of the image pickup device 51. Furthermore, when the knife edge is used, in a portion out of the knife edge, there is not anything that intercepts the optical path of the laser light 20 in a plane crossing the tip of the knife edge 30. Therefore, the image pickup device 51 can be exactly focused on the position corresponding to the surface of the substrate to be treated.

Figure 4:
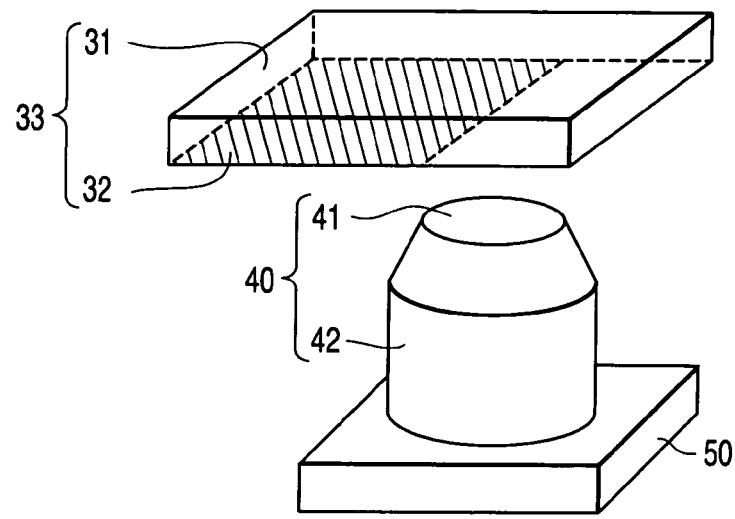
FIG. 4 is a diagram showing one example of arrangement of a transparent substrate in a case where the transparent substrate coated with an interceptive thin film is used.
Figure 5:
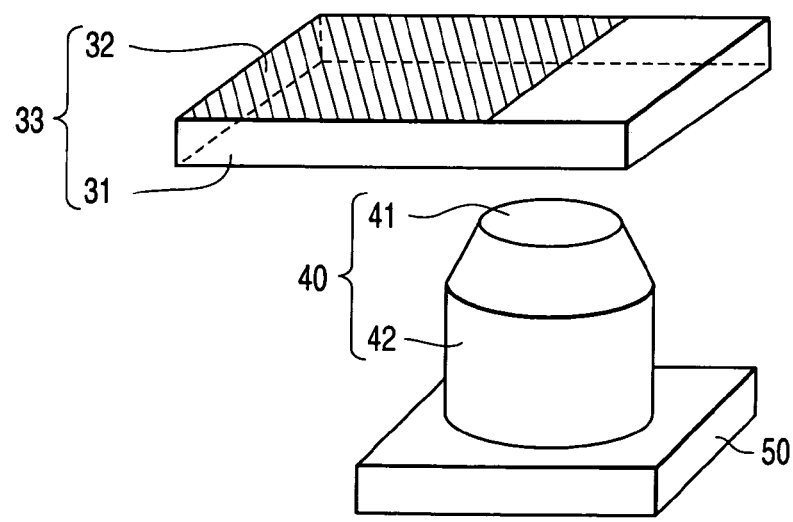
FIG. 5 is a diagram showing another example of the arrangement of the transparent substrate in a case where the transparent substrate coated with the interceptive thin film is used.

Moreover, as shown in FIGS. 4 and 5, an intercepting plate 33 is usable as an intercepting unit. The plate is obtained by coating a part of the surface of a transparent substrate 31 with an interceptive thin film 32. A thickness of the interceptive thin film 32 of the intercepting plate 33 is preferably about 1 µm or less. The object surface of the focusing is a back surface of the intercepting plate 33 in arrangement of FIG. 4, and is a front surface of the intercepting plate 33 in arrangement of FIG. 5. In the arrangement of FIG. 5, when the focusing of the image pickup device is performed, in consideration of a thickness t of the intercepting plate 33 and refraction, the intercepting plate 33 is disposed in such a manner that an edge portion of the interceptive thin film 32 faces the surface of the substrate to be treated in the optical path of the laser light 20.

Figure 6:
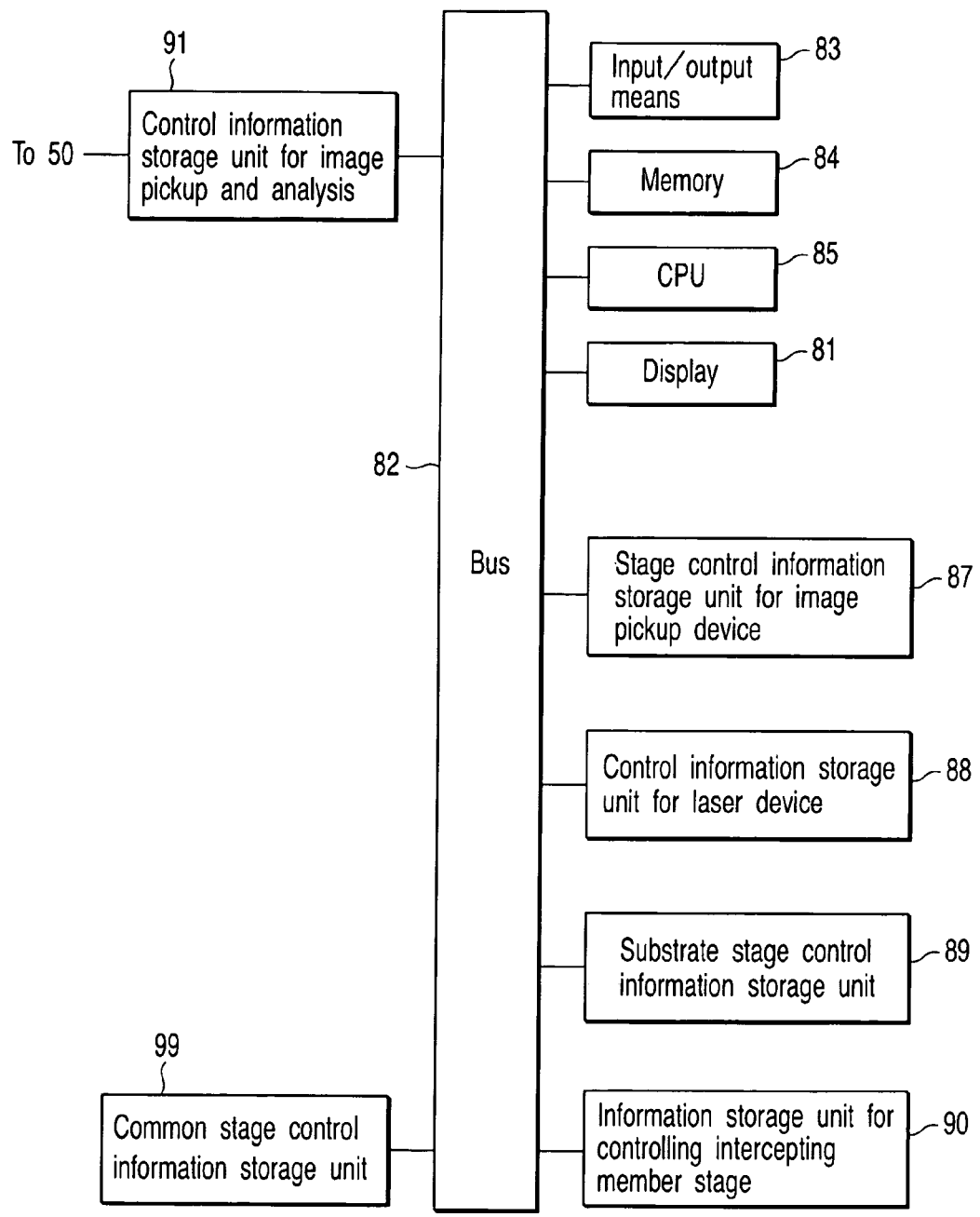
FIG. 6 is a signal block diagram of a laser annealing apparatus incorporating a device for picking up the sectional image of the laser light using the method of the present invention.

FIG. 6 shows a constitution of a control system in the system of FIG. 1. A bus 82 is connected to input/output means 83, a memory 84, a central processing unit (hereinafter referred to as abbreviated as CPU) 85, and the display 81. The memory 84 stores a predetermined operation program. The CPU 85 controls the system by an operation program stored in the memory 84. The display 81 displays input/output information.

The bus 82 is further connected to a control information storage unit 88 for a laser device, a stage control information storage unit 87 for the image pickup device, a substrate stage control information storage unit 89, an information storage unit 90 for controlling an intercepting unit stage, and a common stage control information storage unit 99. In the control information storage unit 88 for the laser device, there is stored a program which automatically controls an operation of the laser light source 1. In the stage control information storage unit 87 for the image pickup device, there is stored a program which controls the image pickup stage 60 for supporting the CCD 50. In the substrate stage control information storage unit 89, there is stored a program which controls a substrate stage 100 for supporting a substrate 10 to be treated. In the common stage control information storage unit 99, there is stored a program to control a common stage 70 on which three stages are laid for the substrate, the intercepting unit, and the image pickup device.

The bus 82 is further connected to a control information storage unit 91 for image pickup and analysis. In this storage unit 91, there is stored a program for automatically executing a predetermined image pickup and analysis operation.

Subsequently, an automatic focusing method for the system of FIG. 1 will be described with reference to the block diagram of FIG. 6. First, prior to an operation for the focusing, the CPU 85 reads a basic program stored in the memory 84 to start the operation. Next, the CPU 85 reads data from the common stage control information storage unit 99. Based on the data, the substrate 10 to be treated or the stage 100 which supports the substrate 10 to be treated is controlled to move from the optical path of the laser light 20 to a predetermined retracted position. In this case, the CPU 85 operates the substrate stage control information storage unit 89 and the information storage unit 90 for controlling the intercepting unit stage. The CPU 85 recognizes that confirmative information indicating that the substrate or the stage has been controlled and retracted is input into the input/output means 83.

Next, the CPU 85 automatically executes a process for focusing the CCD 50. The CPU 85 allows the memory 84 to store information indicating that there is not the substrate 10 to be treated or the image pickup stage 60 in the optical path of the laser light 20. After the CPU recognizes this, the CPU reads a control program from the information storage unit 90 for controlling the intercepting unit stage, and controls the intercepting unit in such a manner as to move the member to a predetermined position where a part of the laser light 20 is intercepted. Simultaneously or subsequently, the CPU 85 reads a control program from the stage control information storage unit 87 for the image pickup device, and moves a device for image pickup and analysis to a predetermined position in the optical path of the laser light 20.

When information indicating that the intercepting unit and the image pickup device have been moved is stored in the memory 84 via the input/output means 83, the CPU 85 reads laser light source control information from the control information storage unit 88 for the laser device, and controls the laser light source 1 to emit the laser light. The CPU 85 reads a focusing control program from the control information storage unit 91 for image pickup and analysis, and displays in the display 81 a light and shade signal of an image of the intercepting unit picked up by the image pickup device simultaneously with the storing of the signal in the memory 84. The CPU 85 outputs as focal position information a condition that the distance of the transition region from the dark level to the bright level of the light and shade signal is shortest (i.e., a half-value breadth of a peak, obtained from a derivative value concerning the distance of the light and shade signal). The information is stored in the memory 84, and simultaneously displayed in a display screen of the display 81.

Figure 7:
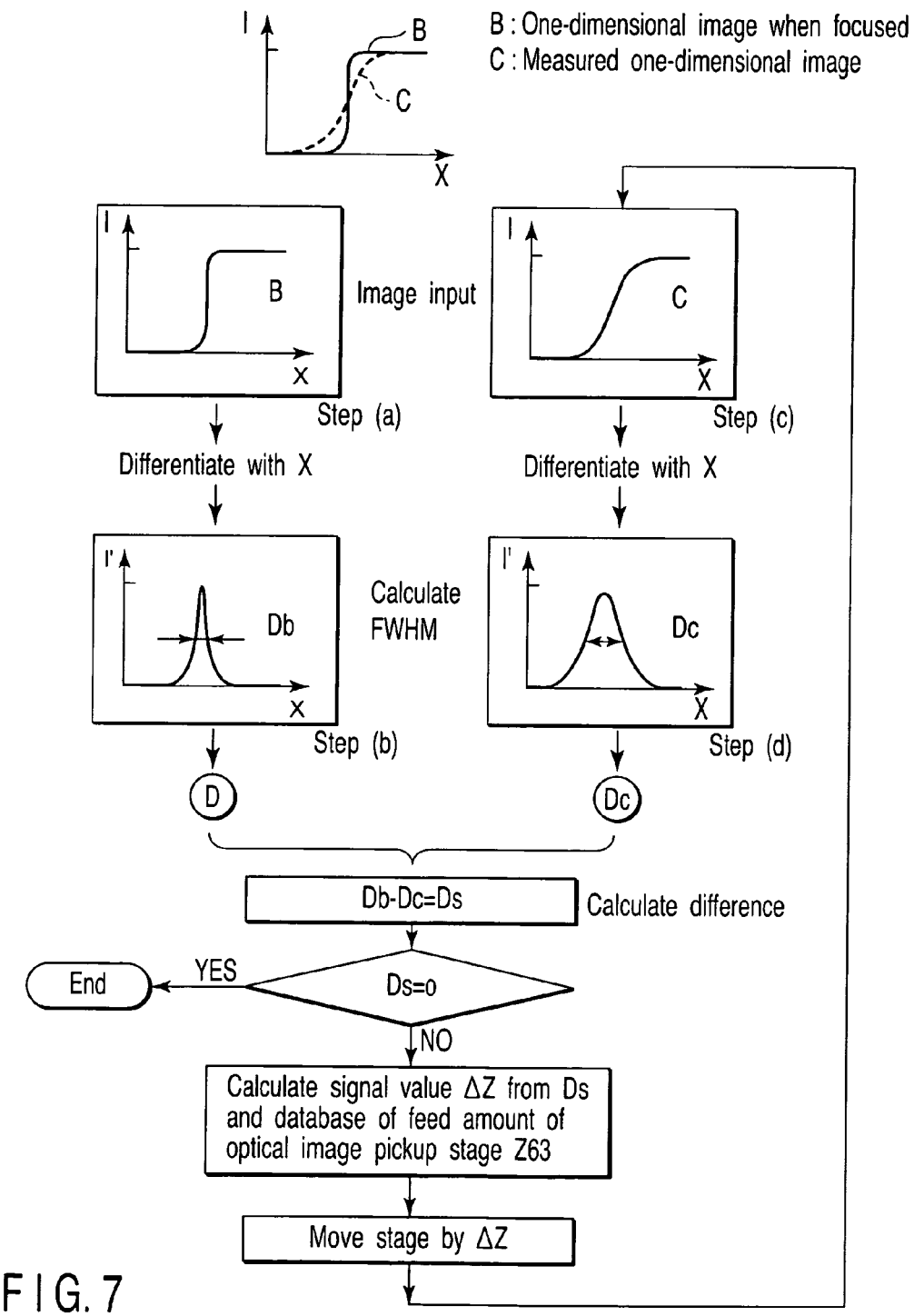
FIG. 7 is an explanatory view of a method of adjusting a focus of the optical system of the image pickup device onto a predetermined cross section.

Next, a specific focusing flow will be described with reference to FIG. 7. It is assumed that most focused image data is B. The image data B may be stored beforehand in the memory (step (a)). A half-value breadth (FWHM) of a waveform obtained by differentiating the data with a distance X is Db (step (b)). This Db may be stored as a database in the memory.

Measured one-dimensional image data C is input (step (c)). In this case, if the above-described fringes are generated, the appropriate low pass filter is applied to remove the fringes. When the one-dimensional image data C is differentiated with respect to the distance X, a full width at half-maximum FWHM value Dc is obtained with respect to the one-dimensional image data C (step (d)). From a difference between this Dc and Db stored beforehand, Ds is obtained.

When this difference Ds is 0, the image forming optics is brought in the focal position. However, when Ds is not 0, a signal value ΔZ of a feed amount of the Z-stage 63 of the image forming optics in a z-direction is calculated accordingly. The Z-stage 63 is moved, and a one-dimensional image is picked up again. This flow is performed until Ds=0. As a result, an optimum value of the Z-stage 63 of the image forming optics is determined as the focal position. Accordingly, preparations are completed for directly picking up the sectional image of the laser light in the height (i.e., height corresponding to the surface of the substrate to be treated) specified by the tip of the knife edge 30.

After confirming focal position information, the CPU 85 retracts the knife edge 30 from the optical path of the laser light 20 to a predetermined retracted position by the program from the information storage unit 90 for controlling the intercepting unit stage. After confirming via the input/output means 83 that the knife edge 30 is retracted from the optical path of the laser light 20, the CPU 85 reads the data from the control information storage unit 88 for the laser device, and emits the laser light from the laser light source 1. Moreover, the CPU 85 adjusts laser intensity by the attenuator 2, and picks up an image of the intensity distribution of the laser light by the image pickup device. The CPU 85 stores an image pickup output signal in the memory 84 via the input/output means 83, and simultaneously displays the signal in the display 81. Thus, the CPU 85 picks up the sectional image of the laser light.

It is to be noted that when the sectional image of the laser light is picked up, the intensity of the laser light is set to be lower than that in actual laser annealing in order to protect the knife edge 30, the image forming optics 40, and the CCD 50. It is to be noted that as to the sectional image in the surface to be treated, irradiated with excimer laser light via a phase shifter (described later), an only absolute value of the light intensity changes, but a distribution shape (beam profile) does not change even when an output of the excimer laser light is changed.

In a typical case, the beam profile of the laser light 20 at a time when the sectional image is picked up is about 100 μmφ in a laser irradiated region of a 2 mm square. This profile is two-dimensionally enlarged, for example, about 100 to 200 times by the objective lens 41, and is projected as an image having a size of about 10 to 20 mmφ onto the CCD 50. Here, for example, assuming that a pixel size of the CCD 50 itself is 10 μm or less, a spatial resolution (i.e., spatial resolution with respect to the beam profile of the laser light) in the position of the surface to be treated is 0.2 to 0.1 μm or less.

Embodiment 2

Figure 8:
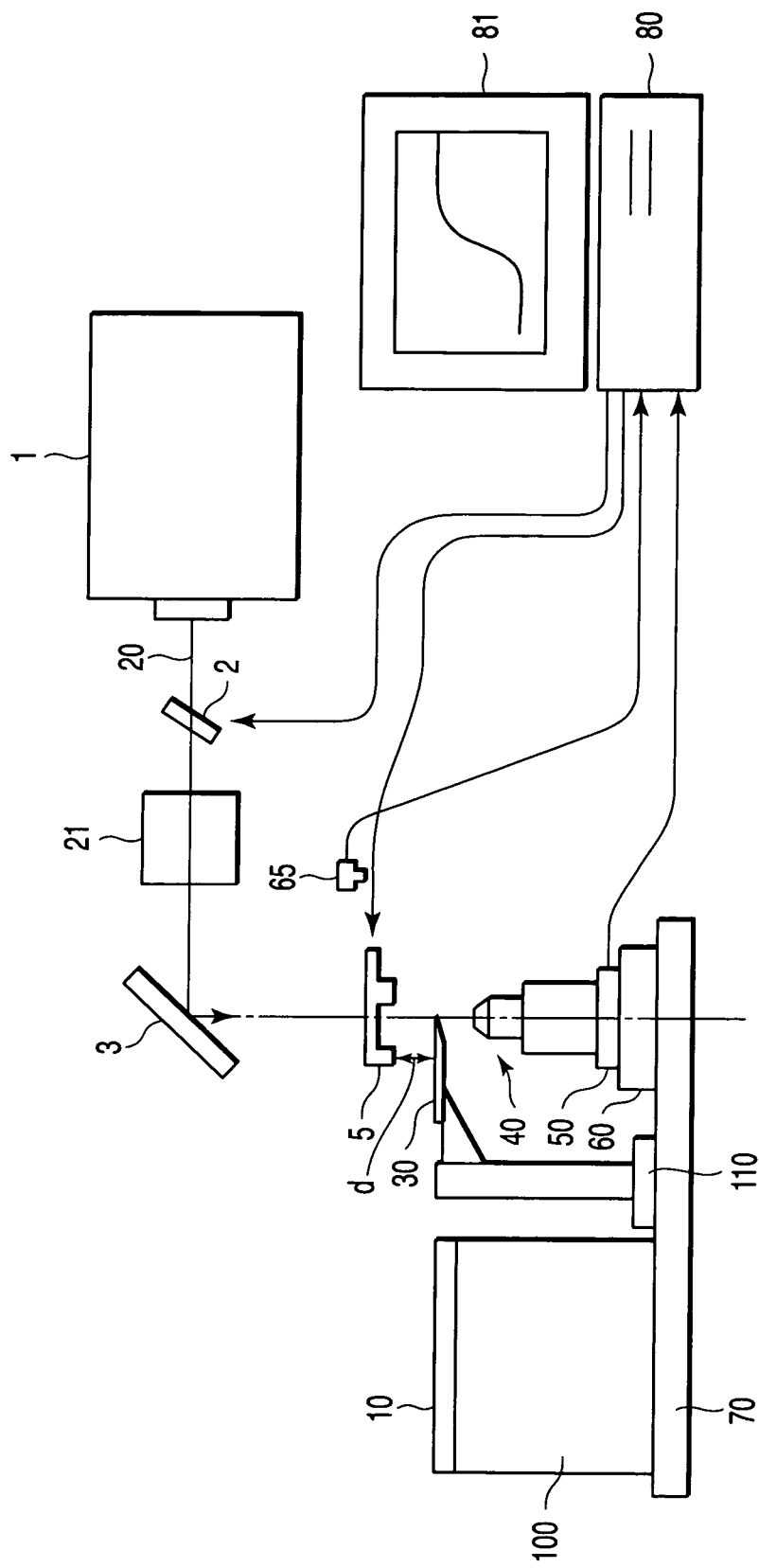
FIG. 8 is a diagram showing an example of a laser annealing apparatus by a proximity system, incorporating the device for picking up the sectional image of the laser light using the method of the present invention.

Example of laser annealing apparatus by proximity system:

FIG. 8 shows an example of a schematic constitution of a laser annealing apparatus in which a method of picking up a sectional image is adopted according to the present invention. In this device, an optical system of a proximity system is adopted, and a phase shifter 5 is disposed right above a substrate in order to irradiate a substrate to be treated with laser light whose light intensity has been modulated. An example of the optical system is a crystallization apparatus. The same components as those of FIG. 1 are denoted with the same reference numerals, and detailed description is omitted.

An attenuator 2, an optical homogenizing system 21, a mirror 3, and the phase shifter 5 are disposed in order along an optical path of laser light 20. The phase shifter 5 is inserted between the optical homogenizing system 21 and a substrate 10 to be treated, and is held at a certain gap d from the substrate 10 to be treated by a support base (not shown). The phase shifter 5 can be moved with respect to an optical axis of the laser light, and may be detached from the optical path of the optical path 20. The gap d is about 60 to 500 μm. A focus of the optical homogenizing system 21 fluctuates by refraction by a thickness of the phase shifter 5. Therefore, a focal position is determined beforehand by calculation, and the substrate 10 to be treated is disposed beforehand in the calculated position.

On a common stage 70, there are arranged and held the substrate 10 to be treated (via a stage 100 for the substrate to be treated), a knife edge 30 (via a stage 110 for an intercepting unit), and an image pickup device (40, 50, 60) for obtaining a sectional image. Heights of the substrate 10 to be treated, knife edge 30, and phase shifter 5 are measured by a height sensor 65. The image pickup device (40, 50, 60) is disposed on the side of a back surface of the knife edge 30. The image pickup device is the same as that described above with reference to FIG. 1. The device comprises an image forming optics 40, a CCD 50, an image pickup stage 60 and the like.

After decaying the laser light 20 emitted from a laser light source 1 by the attenuator 2, the light is transmitted to the mirror 3 through the optical homogenizing system 21. The substrate 10 to be treated and the knife edge 30 are disposed on a focus of the optical homogenizing system 21 via the phase shifter 5.

It is to be noted that the phase shifter 5 is a light intensity modulation device which modulates a phase of the light to thereby form a light intensity distribution adapted to a purpose of treatment of the substrate 10 to be treated on the surface of the substrate 10. The phase shifter 5 is prepared, for example, by etching and forming a stepped position in a quartz substrate. The phase of the optical path 20 is modulated by the phase shifter 5, and a two-dimensional light intensity distribution is imparted to the light. When the light enters the surface of the substrate 10 to be treated, the light is formed into an image.

To confirm a pattern of the laser light formed into the image in this manner, that is, to pick up the sectional image of laser light which enters the surface of the substrate 10 to be treated, first the common stage 70, the stage 110 for the intercepting unit, and the image pickup stage 60 are driven to move the knife edge 30 and the image pickup device (40, 50, 60) onto an extended line of the optical axis of the laser light 20. Moreover, the phase shifter 5 is removed from the optical path of the laser light 20. After ending adjustment of a height and a position of the knife edge 30, and alignment of the image forming optics 40, the CCD 50 or the like with respect to the optical axis of the laser light 20, the knife edge 30 is irradiated with the laser light 20, and focusing of the image forming optics 40 is performed in accordance with a procedure described above. After ending the focusing of the image forming optics 40, the knife edge 30 is retraced, the phase shifter 5 is inserted in the optical path of the laser light 20, and the sectional image of the laser light 20 is picked up.

Moreover, to confirm the pattern of the laser light whose phase has been modulated by the phase shifter 5, the image is picked up by the image pickup device without retracting the phase shifter 5 from the optical axis.

The sectional image (light intensity distribution in a height corresponding to the surface of the substrate to be treated) of the laser light 20 is two-dimensionally enlarged by the image forming optics 40, and is picked up by the CCD 50. The CCD 50 converts the picked up image of the laser light 20 into a digital signal, and sends the signal to a computer 80. Processed data (i.e., the intensity distribution of the laser light whose image has been picked up) is displayed in a display 81.

The picked up sectional image is compared with a target sectional image stored beforehand in the display 81, and it is confirmed that a difference between both of the images falls within a predetermined allowable limit. When the difference deviates from the allowable limit, a distance d between the substrate 10 to be treated and the phase shifter 5 (i.e., fine adjustment of the laser light 20 in an optical axis direction) is adjusted, and the difference is set within the allowable limit. It is to be noted that the sectional image is automatically confirmed and adjusted using the computer 80.

The sectional image is checked during the treatment by the laser light, while the number of the substrates to be treated or an appropriate time interval is set. When it is confirmed by the adjustment that the sectional image (light intensity distribution) is suitable for the laser annealing, the common stage 70 and the stage 100 for the substrate to be treated are driven to dispose the substrate to be treated on the optical path of the laser light 20. After adjusting the attenuator 2 in such a manner as to obtain an appropriate laser fluence, the laser annealing is performed.

It is to be noted that energy (value of fluence) of the excimer laser light is, for example, 200 mJ/cm$^2$ in melting and crystallizing an amorphous silicon thin film 14, and a fluence, for example, of about 800 mJ/cm$^2$ is required in forming silicon grains having large grain diameters. On the other hand, the energy is, for example, about 10 mJ/cm$^2$ to 30 mJ/cm$^2$ in picking up the sectional image of the excimer laser light.

Embodiment 3

Figure 9:
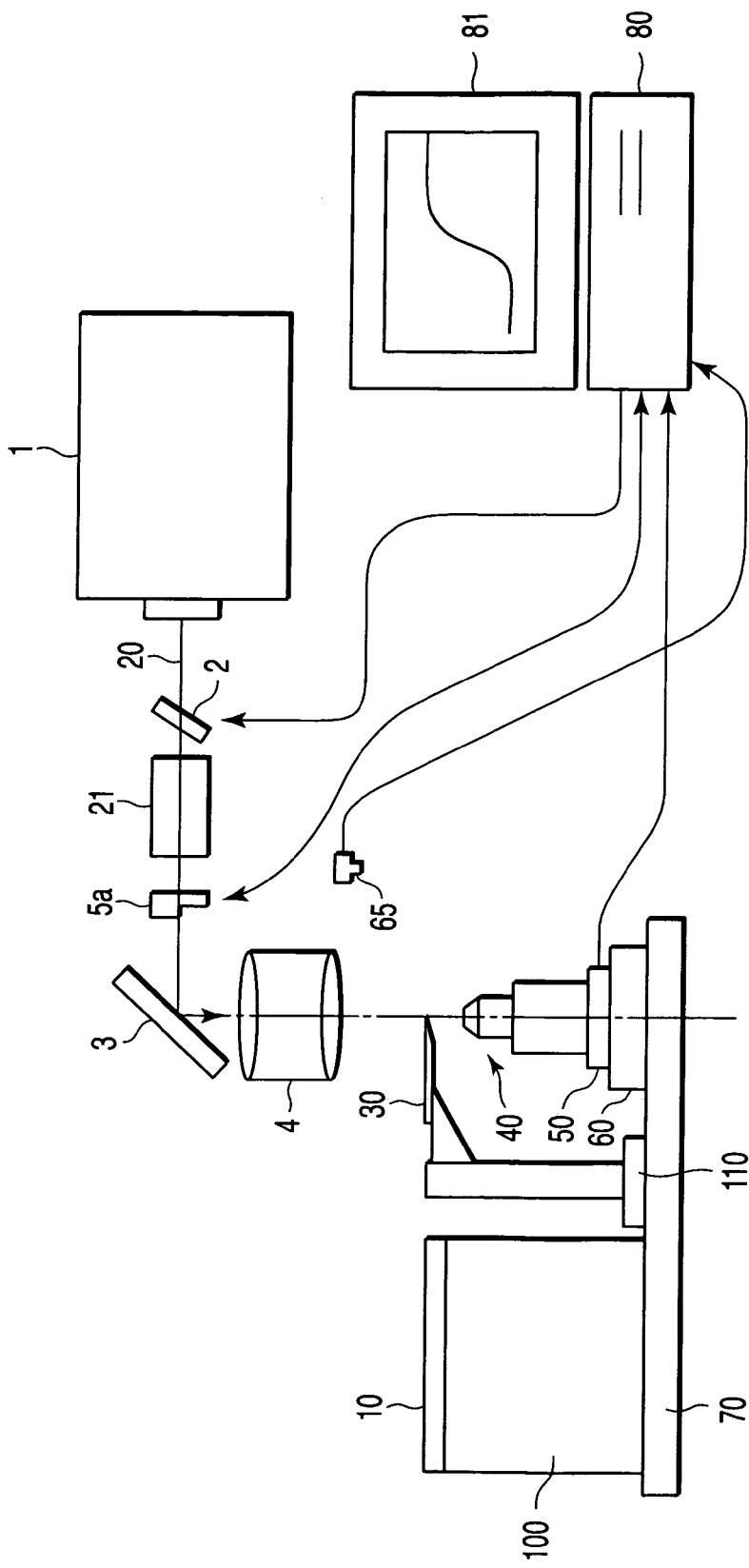
FIG. 9 is a diagram showing an example of a laser annealing apparatus by a projection system, incorporating the device for picking up the sectional image of the laser light using the method of the present invention.

Example of laser annealing apparatus by projection system:

FIG. 9 shows a constitution example of another laser annealing apparatus in which a method of picking up a sectional image is adopted according to the present invention. In this device, an optical system of a projection system is adopted in order to irradiate a substrate to be treated with laser light. The same components as those of FIGS. 1 and 8 are denoted with the same reference numerals, and detailed description is omitted.

On a common stage 70, there are arranged and held a substrate 10 to be treated (via a stage 100 for the substrate to be treated), a knife edge 30 (via a stage 110 for an intercepting unit), and an image pickup device (40, 50, 60). Heights of the substrate 10 to be treated and the knife edge 30 are measured with a height sensor 65. The image pickup device (40, 50, 60) is disposed on the side of a back surface of the knife edge 30. The image pickup device is the same as that described above with reference to FIG. 1, and comprises an image forming optics 40, a CCD 50, an image pickup stage 60 and the like.

In an optical path of laser light 20, an attenuator 2, a homogenizer 21, a phase shifter 5a, a mirror 3, and a projection lens 4 are disposed in order. The heights of the substrate 10 to be treated and the knife edge 30 are measured with the height sensor 65.

The laser light 20 emitted from a laser light source 1 is decayed into an appropriate intensity by the attenuator 2. Next, the light enters the homogenizer 21, and a light intensity distribution is homogenized. A phase of the laser light 20 is modulated by the phase shifter 5a disposed in a position where the light intensity is homogenized. The laser light 20 whose phase has been modulated strikes on the mirror 3, and next enters the projection lens 4. A magnification is converted into that of the projection lens 4, and an image is formed on the irradiated substrate 10 to be treated. Here, the phase shifter 5a disposed in the position where the light intensity is homogenized forms an image, and the image has a conjugated relation such that an image is again formed in a substrate surface position through the projection lens 4. When the substrate is disposed in an image plane, the annealing is performed by the light whose phase has been modulated. When an image of the image plane is picked up, controllability of the laser annealing of the projection system can be enhanced.

A method of picking up the image of the image plane is similar to that in the laser annealing apparatus (FIG. 8) by the above-described proximity system, but places to be adjusted slightly different.

To pick up a sectional image of laser light which enters the surface of the substrate 10 to be treated, first the common stage 70, the stage 110 for the intercepting unit, and the image pickup stage 60 are driven to move the knife edge 30 and the image pickup device (40, 50, 60) onto an extended line of the optical axis of the laser light 20. Moreover, the phase shifter 5a is removed from the optical path of the laser light 20. After ending adjustment of a height and a position of the knife edge 30, and alignment of the image forming optics 40 and the CCD 50 with respect to the optical axis of the laser light 20, the knife edge 30 is irradiated with the laser light 20, and focusing of the image forming optics 40 is performed in accordance with a procedure described above. After ending the focusing of the image forming optics 40, the knife edge 30 is retraced, the phase shifter 5a is inserted in the optical path of the laser light 20, and the sectional image is picked up.

The sectional image (light intensity distribution in a height corresponding to the surface of the substrate to be treated) of the laser light is two-dimensionally enlarged by the image forming optics 40, and is picked up by the CCD 50. The CCD 50 converts the picked up image of the laser light into a digital signal, and sends the signal to a computer 80. Processed data (i.e., the measured intensity distribution of the laser light) is displayed in a display 81.

The picked up sectional image is compared with a target sectional image stored beforehand in the display 81, and it is confirmed that a difference between both of the images falls within a predetermined allowable limit. When the difference deviates from the allowable limit, the substrate 10 to be treated and the phase shifter 5a are adjusted (i.e., a distance in a direction parallel to the optical axis of the laser light 20 is adjusted, or the substrate or the shifter is rotated in a plane vertical to the optical axis of the laser light 20), and the difference is set within the allowable limit. It is to be noted that the sectional image is automatically confirmed and adjusted using the computer 80.

The above-described sectional image is checked, while the number of the substrates to be treated or an appropriate time interval is set. When it is confirmed by the adjustment that the sectional image (light intensity distribution) is suitable for the laser annealing, the common stage 70 and the stage 100 for the substrate to be treated are driven to dispose the substrate to be treated on the optical path of the laser light 20. After adjusting the attenuator 2 in such a manner as to obtain an appropriate laser fluence, the laser annealing is performed.

What is claimed is:

1. A method for measurement of a two-dimensional intensity distribution of un-reflected laser light in a cross section, comprising the steps of:
    disposing an image pickup device in front of the cross section with respect to a direction of the un-reflected laser light incident on the cross section;
    disposing an intercepting unit in the cross section in such a manner as to intercept a part of the un-reflected laser light;
    picking up, by use of the image pickup device, a light and shade image indicating another intensity distribution of the un-reflected laser light which is partially intercepted by the intercepting unit;
    adjusting a focus of an optical system of the image pickup device in such a manner that a pattern of the resultant light and shade image satisfies predetermined conditions; and
    retracting the intercepting unit from an optical path of the un-reflected laser light, and measuring the two-dimensional intensity distribution of the un-reflected laser light in the cross section by use of the image pickup device.

2. The method for measurement of the two-dimensional intensity distribution of the un-reflected laser light according to claim 1, wherein the intercepting unit is a knife edge member and is disposed so that a tip of the knife edge is within the cross section, when a part of the un-reflected laser light is intercepted.

3. The method for measurement of the two-dimensional intensity distribution of the un-reflected laser light according to claim 1, wherein
    the intercepting unit a transparent substrate with a surface at least partially coated with an interceptive thin film, and
    the intercepting unit is disposed so that the interceptive thin film is within the cross section when a part of the un-reflected laser light is intercepted.

4. A method for measurement of a two-dimensional intensity distribution of un-reflected laser light in a cross section at which an object to be treated is to be positioned, said un-reflected laser light having passed through a phase shifter, the method comprising the steps of:
    disposing an image pickup device in front of the cross section with respect to a direction of the un-reflected laser light incident on the cross section;
    disposing an intercepting unit in the cross section in such a manner as to intercept a part of the un-reflected laser light;
    picking up, by use of the image pickup device, a light and shade image indicating an intensity distribution of the un-reflected laser light which is partially intercepted by the intercepting unit;
    adjusting a focus of an optical system of the image pickup device in such a manner that a pattern of the resultant light and shade image satisfies predetermined conditions; and
    retracting the intercepting unit from an optical path of the un-reflected laser light, and measuring the two-dimensional intensity distribution of the un-reflected laser light in the cross section by use of the image pickup device.

5. The method of measurement of the two-dimensional intensity distribution of the un-reflected laser light according to claim 4, wherein
    wherein the intercepting unit is a knife edge member and is disposed so that a tip of the knife edge is within the cross section, when a part of the un-reflected laser light is intercepted.

6. The method of measurement of the two-dimensional intensity distribution of the un-reflected laser light according to claim 4, wherein
    the intercepting unit is a transparent substrate with a surface at least partially coated with an interceptive thin film, and
    the intercepting unit is disposed so that the interceptive thin film is within the cross section when a part of the un-reflected laser light is intercepted.

7. The method of claim 1, further comprising:
    disposing a substrate including a thin film semiconductor in the cross section in such a manner as to irradiate the substrate so as to crystallize the thin film semiconductor.

8. The method of claim 4, further comprising:
    disposing a substrate including a thin film semiconductor in the cross section in such a manner as to irradiate the substrate so as to crystallize the thin film semiconductor.

* * * * *